United States Patent
Ide

(10) Patent No.: US 9,604,623 B2
(45) Date of Patent: Mar. 28, 2017

(54) DRIVE CONTROL SYSTEM FOR ELECTRIC MOTOR AND METHOD OF CONTROLLING ELECTRIC MOTOR

(71) Applicant: HONDA MOTOR CO., LTD., Tokyo (JP)

(72) Inventor: Hirohito Ide, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 17 days.

(21) Appl. No.: 14/078,535

(22) Filed: Nov. 13, 2013

(65) Prior Publication Data
US 2014/0172209 A1 Jun. 19, 2014

(30) Foreign Application Priority Data
Dec. 14, 2012 (JP) .................................. 2012-273258

(51) Int. Cl.
*B60W 20/00* (2016.01)
*B60W 10/08* (2006.01)
(Continued)

(52) U.S. Cl.
CPC .............. *B60W 10/08* (2013.01); *B60L 3/106* (2013.01); *B60L 7/14* (2013.01); *B60L 11/126* (2013.01); *B60L 15/20* (2013.01); *B60L 15/2009* (2013.01); *B60W 10/184* (2013.01); *B60W 30/18172* (2013.01); *B60W 30/20* (2013.01);
(Continued)

(58) Field of Classification Search
None
See application file for complete search history.

(56) References Cited

U.S. PATENT DOCUMENTS 6,487,998 B1 * 12/2002 Masberg ................. B60L 7/003
123/192.1
2009/0326777 A1 * 12/2009 Oshima ................. B60T 8/1706
701/83
(Continued)

FOREIGN PATENT DOCUMENTS

JP 2002-171607 6/2001
JP 3642254 B2 10/2001
(Continued)

OTHER PUBLICATIONS

Japanese Office Action for corresponding JP Application No. 2012-273258, Jun. 2, 2015.

*Primary Examiner* — John R Olszewski
*Assistant Examiner* — James M McPherson
(74) *Attorney, Agent, or Firm* — Mori & Ward, LLP

(57) ABSTRACT

A drive control system for an electric motor includes a slippage determination device, a tentative vibration damper torque calculator, a vibration damper torque limit value setting device, a vibration damper torque setting device, and a control device. The vibration damper torque setting device is configured to set a control torque obtained by limiting a tentative vibration damper torque using a limit value set by the vibration damper torque limit value setting device. The control device is configured to control driving of the electric motor in accordance with a command value of a torque obtained by combining a requested torque for the electric motor with the control torque set by the vibration damper torque setting device.

19 Claims, 7 Drawing Sheets

(51) Int. Cl.
  *B60L 3/10*      (2006.01)
  *B60W 10/184*    (2012.01)
  *B60W 30/20*     (2006.01)
  *B60L 7/14*      (2006.01)
  *B60L 11/12*     (2006.01)
  *B60L 15/20*     (2006.01)
  *B60W 30/18*     (2012.01)

(52) U.S. Cl.
  CPC ....... *B60L 2210/10* (2013.01); *B60L 2210/40* (2013.01); *B60L 2240/12* (2013.01); *B60L 2240/421* (2013.01); *B60L 2240/423* (2013.01); *B60L 2240/461* (2013.01); *B60L 2240/465* (2013.01); *B60L 2240/80* (2013.01); *B60L 2250/24* (2013.01); *B60L 2250/26* (2013.01); *B60L 2270/145* (2013.01); *B60W 20/00* (2013.01); *B60W 30/18036* (2013.01); *B60W 2510/082* (2013.01); *B60W 2710/081* (2013.01); *B60W 2710/083* (2013.01); *B60W 2710/182* (2013.01); *Y02T 10/6217* (2013.01); *Y02T 10/645* (2013.01); *Y02T 10/7077* (2013.01); *Y02T 10/7216* (2013.01); *Y02T 10/7241* (2013.01); *Y02T 10/7275* (2013.01)

(56) References Cited

U.S. PATENT DOCUMENTS

| | | | |
|---|---|---|---|
| 2010/0241305 A1* | 9/2010 | Itabashi et al. | 701/34 |
| 2011/0266760 A1* | 11/2011 | Itabashi | 280/5.507 |
| 2012/0277943 A1* | 11/2012 | Kim | 701/22 |
| 2013/0002176 A1* | 1/2013 | Kim | 318/376 |

FOREIGN PATENT DOCUMENTS

| | | |
|---|---|---|
| JP | 2003-088152 | 3/2003 |
| JP | 2004-096825 | 3/2004 |
| JP | 2009-273328 | 11/2009 |

* cited by examiner

FIG. 3

| SHIFT POSITION | OPERATION FOR SLIPPAGE | ROTATIONAL DIRECTION OF MOTOR IN VIBRATION DAMPING CONTROL | POSITIVE VIBRATION DAMPER TORQUE | NEGATIVE VIBRATION DAMPER TORQUE | REMARKS |
|---|---|---|---|---|---|
| DRIVE RANGE (D) | ACCELERATION | FORWARD ROTATION | +0 [Nm] | −30 [Nm] | STOP OUTPUTTING POSITIVE VIBRATION DAMPER TORQUE THAT CONSUMES POWER |
| DRIVE RANGE (D) | DECELERATION | FORWARD ROTATION | +0 [Nm] | −30 [Nm] | ABSOLUTE VALUE OF CONSUMPTION POWER OF MOTOR DOES NOT INCREASE SINCE ROTATION SPEED DECREASES IN DECELERATION |
| REVERSE (R) | ACCELERATION | REVERSE ROTATION | +30 [Nm] | −0 [Nm] | NEGATIVE VIBRATION DAMPER TORQUE THAT CONSUMES POWER IS NOT OUTPUT |
| REVERSE (R) | DECELERATION | REVERSE ROTATION | +30 [Nm] | −0 [Nm] | ABSOLUTE VALUE OF CONSUMPTION POWER OF MOTOR DOES NOT INCREASE SINCE ROTATION SPEED DECREASES IN DECELERATION |

DRIVE CONTROL SYSTEM FOR ELECTRIC MOTOR AND METHOD OF CONTROLLING ELECTRIC MOTOR

CROSS-REFERENCE TO RELATED APPLICATIONS

The present application claims priority under 35 U.S.C. §119 to Japanese Patent Application No. 2012-273258, filed Dec. 14, 2012, entitled "Drive Control System for Electric Motor." The contents of this application are incorporated herein by reference in their entirety.

BACKGROUND

1. Field

The present disclosure relates to a drive control system for an electric motor and to a method of controlling the electric motor.

2. Description of the Related Art

Japanese Patent No. 3642254 describes an apparatus for reducing torque variation of an engine or a drive axle. Even when a drive command signal obtained by combining a drive instruction signal instructing a drive condition of motor generator connected to, for example, an output shaft of an engine and a vibration damper control signal for reducing the torque variation of, for example, the engine using motor generator is outside the output range of the motor generator, the apparatus limits the drive command signal and adjusts the drive command signal for an offset of a drive regenerative amount caused by the limitation. Through the adjustment process, offset of a drive regenerative amount from the drive instruction value is eliminated and, thus, a decrease in the effect of the torque variation reduction control can be made small.

SUMMARY

According to one aspect of the present invention, a drive control system for an electric motor includes a slippage determination device, a tentative vibration damper torque calculator, a vibration damper torque limit value setting device, a vibration damper torque setting device, and a control device. The slippage determination device is configured to determine whether a drive wheel of a vehicle slips. The tentative vibration damper torque calculator is configured to calculate a tentative vibration damper torque to reduce a variation component of a rotational speed of one of a drive axle and the electric motor. The drive axle is mechanically connected to the drive wheel. The electric motor is mounted in the vehicle as a drive source. The vibration damper torque limit value setting device is configured to set, for a predetermined period of time after the slippage determination device determines that the drive wheel slips, a limit value to limit a vibration damper torque that increases an absolute value of the rotational speed of the electric motor or the drive axle. The vibration damper torque setting device is configured to set a control torque obtained by limiting the tentative vibration damper torque using the limit value set by the vibration damper torque limit value setting device. The control device is configured to control driving of the electric motor in accordance with a command value of a torque obtained by combining a requested torque for the electric motor with the control torque set by the vibration damper torque setting device.

According to another aspect of the present invention, in a method of controlling an electric motor, it is determined whether a drive wheel of a vehicle slips. A tentative vibration damper torque is calculated to reduce a variation component of a rotational speed of one of a drive axle and the electric motor. The drive axle is mechanically connected to the drive wheel. The electric motor is mounted in the vehicle as a drive source. A limit value to limit a vibration damper torque that increases an absolute value of the rotational speed of the electric motor or the drive axle is set for a predetermined period of time after it is determined that the drive wheel slips. A control torque obtained by limiting the tentative vibration damper torque is set using the limit value. Driving of the electric motor is controlled in accordance with a command value of a torque obtained by combining a requested torque for the electric motor with the control torque.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

FIG. 3 is a table indicating the conditions for a vibration damper torque limit value that is to be set by the vibration damper torque limit value setting unit.

DESCRIPTION OF THE EMBODIMENTS

Figure 1:
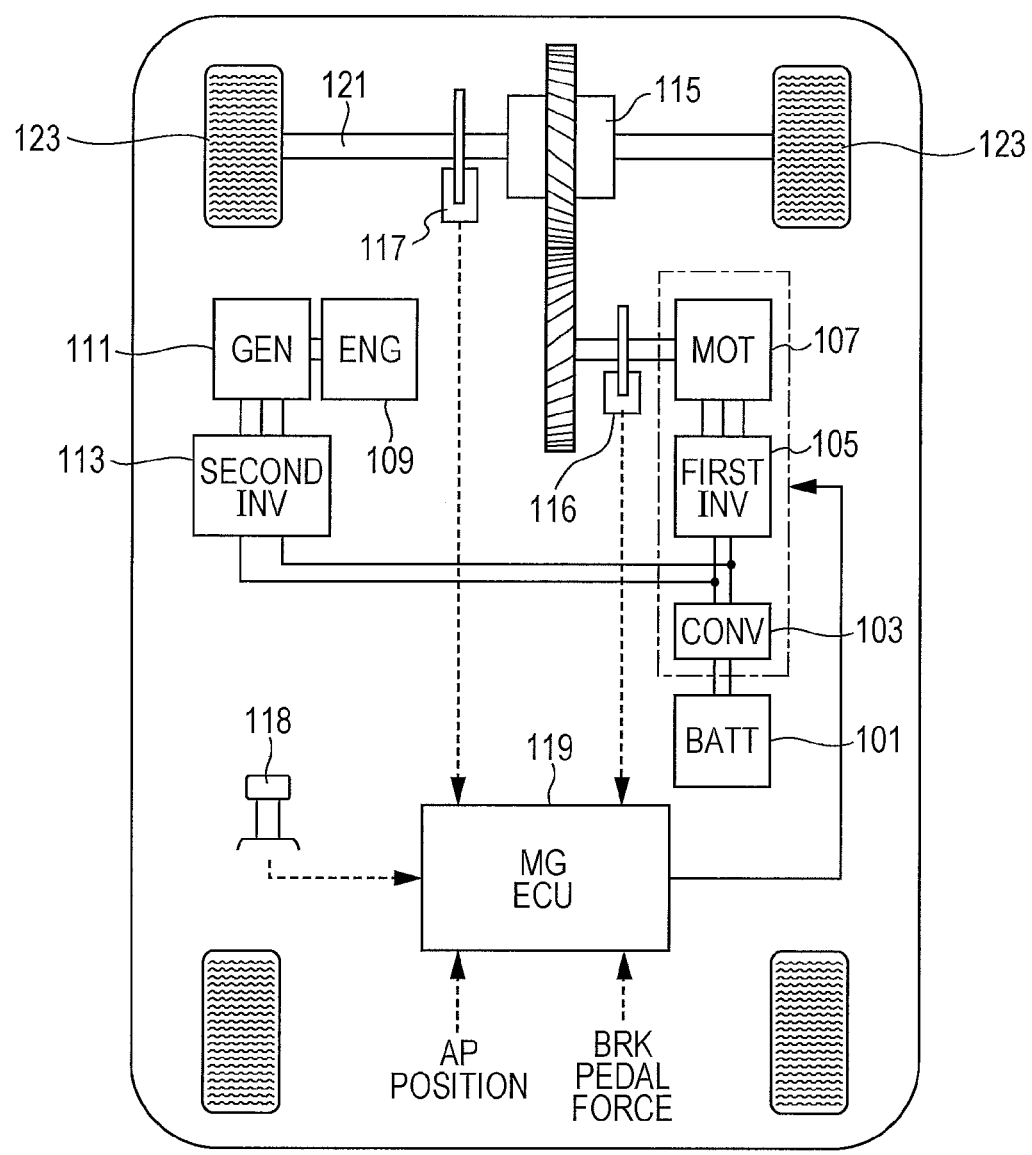
FIG. 1 is a block diagram of the internal configuration of a series HEV.

The embodiments will now be described with reference to the accompanying drawings, wherein like reference numerals designate corresponding or identical elements throughout the various drawings.

Note that a drive control system according to the exemplary embodiment described below is mounted in a vehicle, such as an electric vehicle (EV) or a hybrid electric vehicle (HEV).

FIG. 1 is a block diagram of the internal configuration of a series HEV. As illustrated in FIG. 1, a series HEV (hereinafter simply referred to as a "vehicle") includes an electricity storage device (BATT) 101, a converter (CONV) 103, a first inverter (first INV) 105, an electric motor (Mot) 107, an internal-combustion engine (ENG) 109, a generator (GEN) 111, a second inverter (second INV) 113, a gearbox (hereinafter simply referred to as a "gear") 115, a rotation speed sensor 116, a rotation speed sensor 117, a gearshift operation unit 118, and a management ECU (MG ECU) 119. Note that in FIG. 1, a dotted arrow indicates value data, and a solid arrow indicates a control signal including instruction information.

The electricity storage device 101 includes a plurality of power storage cells connected in series. The electricity storage device 101 supplies, for example, a high voltage of 100 V to 200 V. The power storage cell is, for example, a lithium-ion cell or a nickel-hydrogen cell. The converter 103 steps up or steps down a DC output voltage of the electricity storage device 101 to obtain another DC voltage. The first inverter 105 converts a DC voltage into an AC voltage and supplies three-phase currents to the electric motor 107. In addition, the first inverter 105 converts an AC voltage input during a regenerative operation performed by the electric motor 107 into a DC voltage.

The electric motor 107 generates the power used by the vehicle to travel. The torque generated by the electric motor 107 is transferred to a drive wheel 123 via the gear 115 and a drive axle 121. Note that a rotor of the electric motor 107 is directly coupled to the gear 115. In addition, the drive axle 121 is mechanically connected to the drive wheel 123. The electric motor 107 operates as a generator in regenerative braking. The internal-combustion engine 109 is used to drive the generator 111.

The generator 111 is driven by the power of the internal-combustion engine 109 so as to generate electricity. The electricity generated by the generator 111 is stored in the electricity storage device 101 or is supplied to the electric motor 107 via the second inverter 113 and the first inverter 105. The second inverter 113 converts the AC voltage generated by the generator 111 to a DC voltage. The electricity converted by the second inverter 113 is stored in the electricity storage device 101 or is supplied to the electric motor 107 via the first inverter 105.

The gear 115 is a single fixed gear corresponding to, for example, a fifth gear. Accordingly, the gear 115 converts the driving force from the electric motor 107 into the rotational speed and the torque in a particular gear ratio and transfers the rotational speed and the torque to the drive axle 121.

The rotation speed sensor 116 detects the rotational speed of the electric motor 107. In addition, the rotation speed sensor 117 detects the rotational speed of the drive axle 121. A signal indicating each of the rotational speeds detected by the rotation speed sensors 116 and 117 is sent to the management ECU 119.

The gearshift operation unit 118 is a select lever operated by a driver of the vehicle. Through the operation of the gearshift operation unit 118, one of the following shift positions of the vehicle can be selected: Parking (P), Reverse (R), and Drive Range (D). A signal indicating the shift position selected by the gearshift operation unit 118 is sent to the management ECU 119. Note that to move forward the vehicle, the driver operates the gearshift operation unit 118 and sets the shift position to Drive range (D). In addition, to move rearward the vehicle, the driver operates the gearshift operation unit 118 and sets the shift position to Reverse (R).

The management ECU 119 acquires information indicating an accelerator pedal position (AP position) in accordance with the accelerator operation performed by the driver of the vehicle, a brake pedal force (BRK pedal force) in accordance with the braking operation performed by the driver, and the shift position in accordance with the operation performed on the gearshift operation unit 118 by the driver. In addition, the management ECU 119 controls, for example, the electric motor 107, the internal-combustion engine 109, and the generator 111. According to the present exemplary embodiment, the drive source of the vehicle is the electric motor 107. Accordingly, when the shift position is set to Drive range (D) and if the accelerator pedal is pressed down, the management ECU 119 controls the converter 103, the first inverter 105, and the electric motor 107 so that the electric motor 107 operates in forward rotation. In contrast, when the shift position is set to Reverse (R) and if the accelerator pedal is pressed down, the management ECU 119 controls the converter 103, the first inverter 105, and the electric motor 107 so that the electric motor 107 operates in reverse rotation. Furthermore, the management ECU 119 performs the vibration damping control if the drive wheel 123 slips. Note that the management ECU 119 performs the vibration damping control if the torque varies when the drive wheel 123 slips and, thereafter, the drive wheel 123 regains grip, causing a decrease in the rotational speed.

Figure 2:
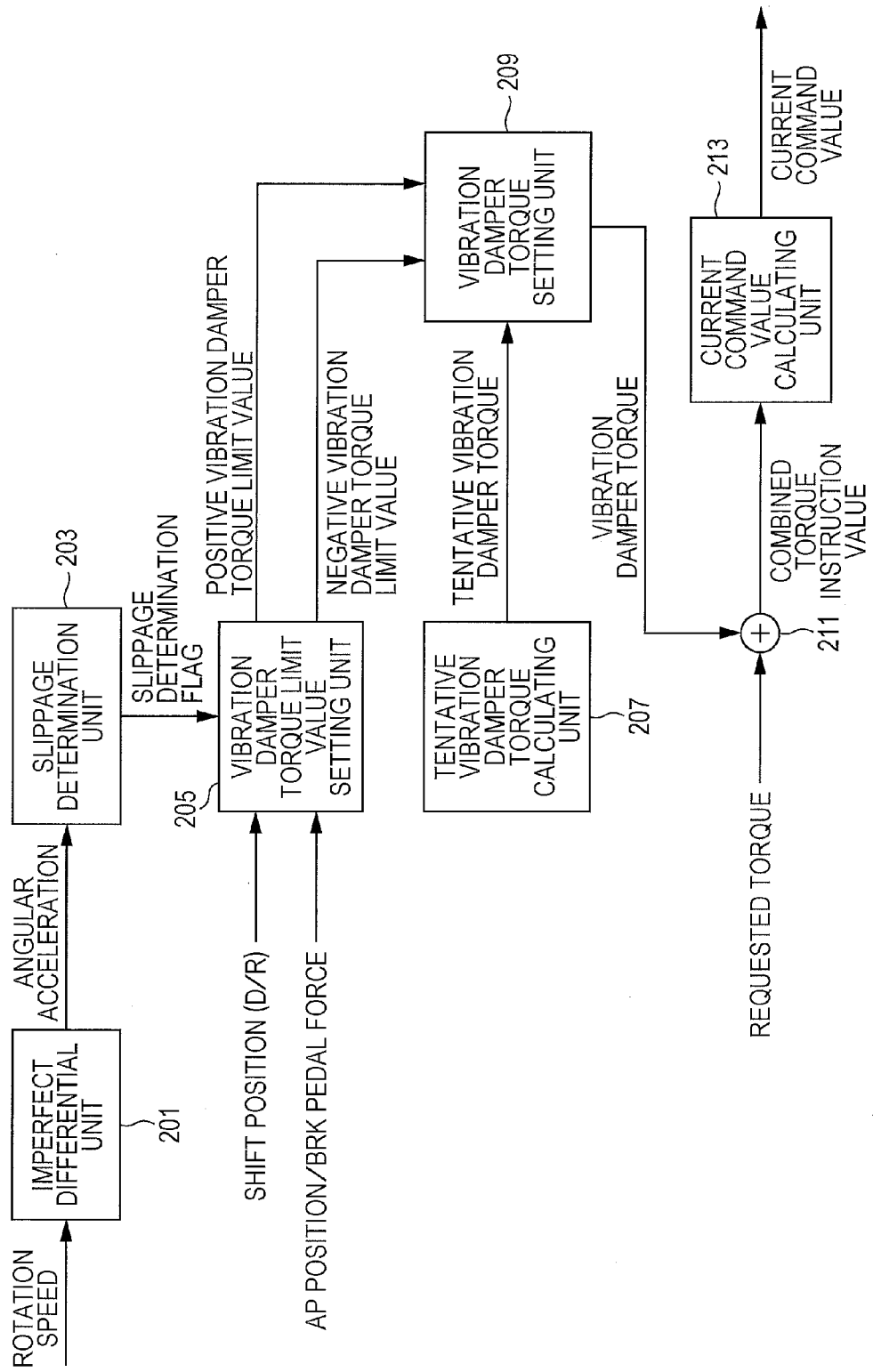
FIG. 2 is a block diagram of the internal configuration of a management ECU.

FIG. 2 is a block diagram of the internal configuration of the management ECU 119. As illustrated in FIG. 2, the management ECU 119 includes an imperfect differential unit 201, a slippage determination unit 203, a vibration damper torque limit value setting unit 205, a tentative vibration damper torque calculating unit 207, a vibration damper torque setting unit 209, a torque combining unit 211, and a current command value calculating unit 213.

The imperfect differential unit 201 imperfectly differentiates the rotational speed of the electric motor 107 detected by the rotation speed sensor 116 and calculates the angular acceleration of the rotation of the electric motor 107. Note that the imperfect differential unit 201 may imperfectly differentiate the rotational speed of the drive axle 121 detected by the rotation speed sensor 117. Note that, at that time, a resonant component caused by the torsion of the drive axle 121 is included in the rotational speed of the drive axle 121.

If the angular acceleration obtained by the imperfect differential unit 201 is higher than or equal to a predetermined value, the slippage determination unit 203 determines that the drive wheel 123 slips. Note that the predetermined value to be compared with the angular acceleration by the slippage determination unit 203 is set in accordance with the hysteresis. The slippage determination unit 203 sets a slippage determination flag in accordance with a result of the comparison. That is, upon determining that slippage occurs, the slippage determination unit 203 sets the slippage determination flag (the slippage determination flag=1).

Torsion of the shafts of a drive system including the electric motor 107 and the drive axle 121 causes torsional resonance of the rotation fluctuation occurring at least in one cycle. When torsional resonance of the rotation fluctuation occurs and if a vibration damper torque for stopping the resonance is calculated, excess output may be obtained. Accordingly, in order to prevent excess output and, in addition, in order to prevent instability (hunting) of the result of slippage determination, the slippage determination unit 203 includes a delay timer (not illustrated). The set time of the delay timer is determined in accordance with the resonance frequency of rotation fluctuation caused by the torsion of the drive axle 121. For example, if the resonance frequency is 10 Hz, the cycle time of the resonance frequency is 100 msec. In such a case, the delay time of the delay timer is set to a time longer than 100 msec (i.e., the cycle time of the resonance frequency). Upon determining that the drive wheel 123 slips, the slippage determination unit 203 continues to set the slippage determination flag to "1" from the time the determination is made to the time the set time elapses.

If the slippage determination flag is set (the slippage determination flag=1), the vibration damper torque limit value setting unit 205 sets a negative vibration damper torque limit value and a positive vibration damper torque limit value using the conditions indicated by the table illustrated in FIG. 3 on the basis of the shift position, the AP position, and the BRK pedal force. FIG. 3 is a table indicating the conditions for the vibration damper torque limit value that is used by the vibration damper torque limit value setting unit 205 to set. If the slippage determination flag is reset (the slippage determination flag=0), the vibration damper torque limit value setting unit 205 sets the positive vibration damper torque limit value to +30 Nm and sets the negative vibration damper torque limit value to −30 Nm.

As illustrated in FIG. 3, when the shift position is set to Drive range (D) and if slippage occurs due to depression of the accelerator pedal, the positive vibration damper torque limit value for speeding up the forward rotation of the electric motor 107 is set to +0 Nm. In addition, the negative vibration damper torque limit value for slowing down the forward rotation of the electric motor 107 is set to −30 Nm. If these vibration damper torque limit values are set, control is performed so that the positive vibration damper torque that increases the rotational speed of the electric motor 107 and consumes power is not output.

Similarly, when the shift position is set to Drive range (D) and if slippage occurs due to depression of the brake pedal, the positive vibration damper torque limit value is set to +0 Nm. In addition, the negative vibration damper torque limit value is set to −30 Nm. If the brake pedal is depressed, the vehicle slows down. Accordingly, the rotational speed of the electric motor 107 decreases. Thus, in the same manner, control is performed so that the positive vibration damper torque that increases the rotational speed of the electric motor 107 and consumes power is not output.

In contrast, when the shift position is set to Reverse (R) and if slippage occurs due to depression of the acceleration pedal, the positive vibration damper torque limit value for slowing down the reverse rotation of the electric motor 107 is set to +30 Nm. In addition, the negative vibration damper torque limit value for speeding up the reverse rotation of the electric motor 107 is set to −0 Nm. If these vibration damper torque limit values are set, control is performed so that the negative vibration damper torque that increases the rotational speed of the electric motor 107 and consumes power is not output.

Similarly, when the shift position is set to Reverse (R) and if slippage occurs due to depression of the brake pedal, the positive vibration damper torque limit value is set to +30 Nm. In addition, the negative vibration damper torque limit value is set to −0 Nm. If the brake pedal is depressed, the vehicle slows down. Accordingly, the rotational speed of the electric motor 107 decreases. Thus, in the same manner, control is performed so that the negative vibration damper torque that increases the rotational speed of the electric motor 107 and consumes power is not output.

Figure 4:
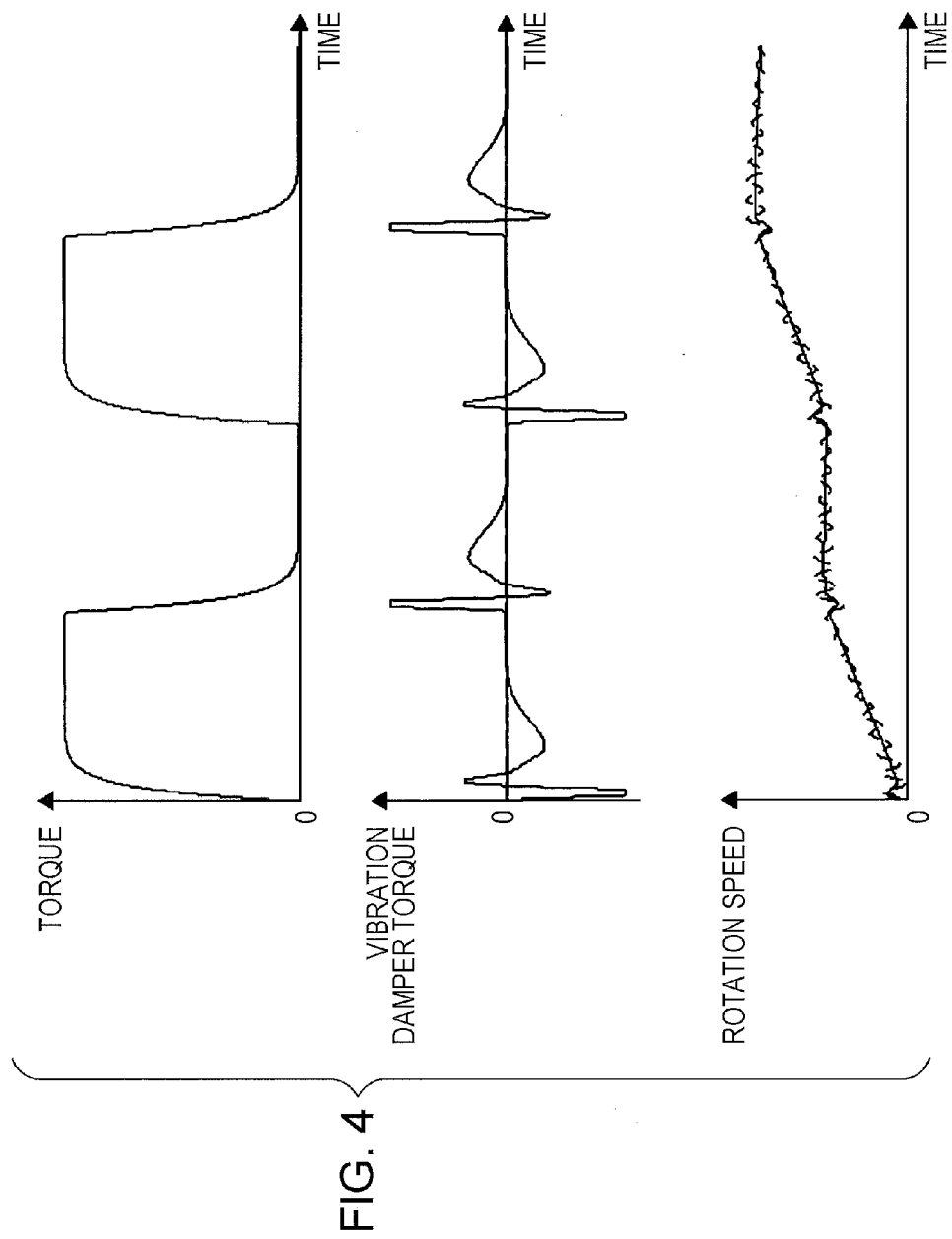
FIG. 4 is a graph illustrating an example of the rotational speed variations occurring when vibration damping control based on a tentative vibration damper torque is performed and when vibration damping control based on the tentative vibration damper torque is not performed in torque variation.

In torque variation occurring when the drive wheel 123 slips and, thereafter, regains grip and, thus, the rotational speed decreases, the tentative vibration damper torque calculating unit 207 calculates a vibration damper torque for avoiding a slight variation component that could be included in the rotational speed of the electric motor 107 or the drive axle 121 as a "tentative vibration damper torque". FIG. 4 is a graph illustrating an example of the rotational speed variations occurring when the vibration damping control based on the tentative vibration damper torque is performed and when vibration damping control based on a tentative vibration damper torque is not performed in torque variation. A solid line in the middle and lower sections of FIG. 4 indicates the rotational speed variation when the vibration damping control based on the tentative vibration damper torque is performed, and the dotted line indicates the rotational speed variation when such vibration damping control is not performed. As indicated by the dotted line in the lower section of FIG. 4, if the vibration damping control is not performed, the rotational speed includes a slight variation component in the rotational speed of the electric motor 107 or the drive axle 121. This variation component causes vibration.

The vibration damper torque setting unit 209 limits the tentative vibration damper torque calculated by the tentative vibration damper torque calculating unit 207 within the range from the positive vibration damper torque limit value to the negative vibration damper torque limit value set by the vibration damper torque limit value setting unit 205. Thereafter, the vibration damper torque setting unit 209 sets "control torque" to the value that meets the limitation.

The torque combining unit 211 adds the control torque set by the vibration damper torque setting unit 209 to a requested torque for the electric motor 107 calculated using the rotational speed of the electric motor 107 or the drive wheel 123 and the AP position. A "combined torque", which is the sum of the requested torque and the control torque, is output from the torque combining unit 211 as a "combined torque instruction value".

The current command value calculating unit 213 calculates a command value of an electrical current to be supplied to the electric motor 107 so that the electric motor 107 outputs a torque indicated by the combined torque instruction value output from the torque combining unit 211.

Figure 5:
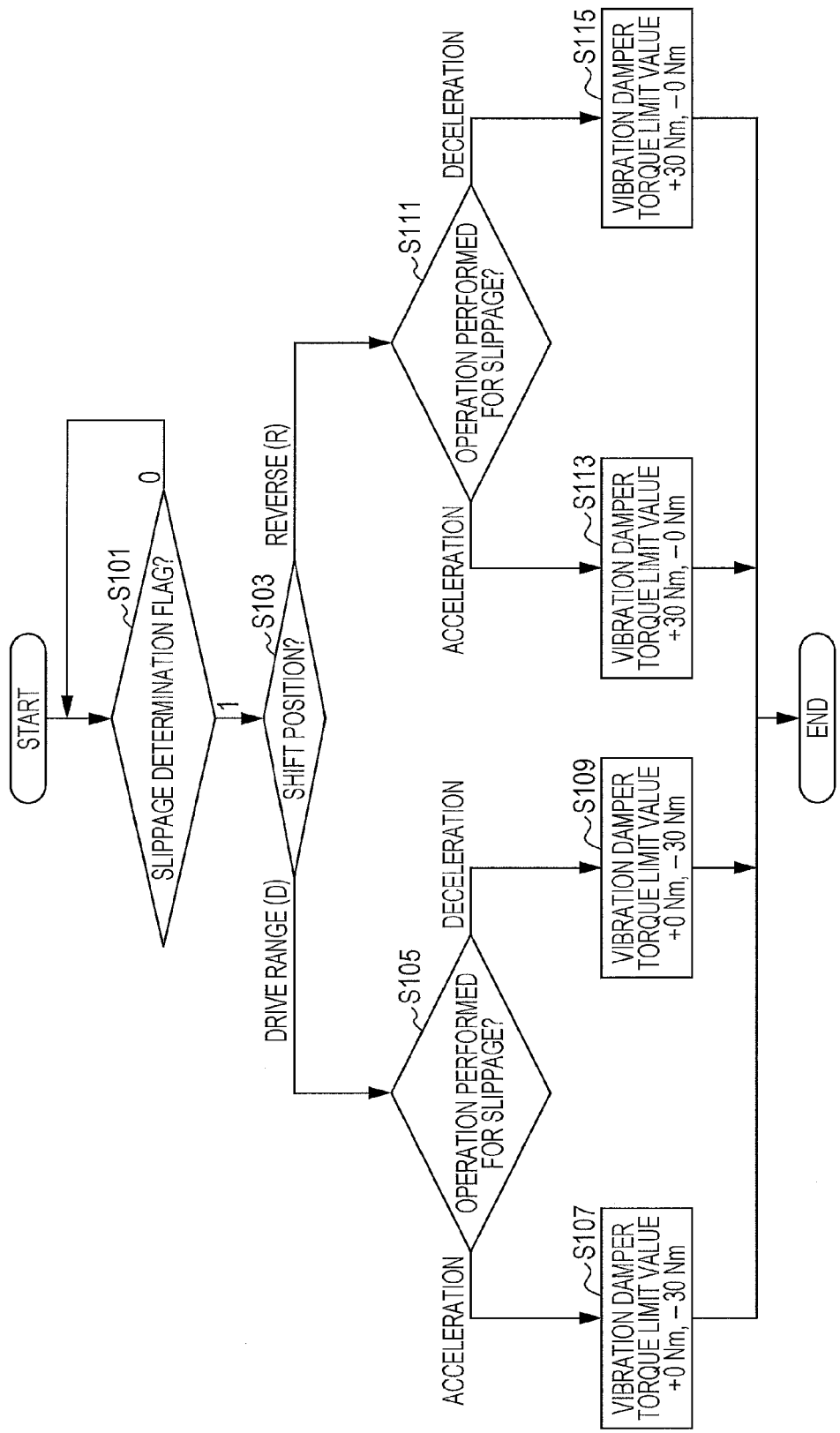
FIG. 5 is a flowchart illustrating the operation performed by a management ECU when the management ECU sets the vibration damper torque limit value.

FIG. 5 is a flowchart illustrating the operation performed by the management ECU 119 when the management ECU 119 sets the vibration damper torque limit value. As illustrated in FIG. 5, the vibration damper torque limit value setting unit 205 determines whether the slippage determination flag is 1 or 0 (step S101). If the slippage determination flag=1, the processing proceeds to step S103. However, if the slippage determination flag=0, the processing returns to step S101. In step S103, the vibration damper torque limit value setting unit 205 determines whether the shift position is Drive range (D) or Reverse (R). If the shift position is Drive range (D), the processing proceeds to step S105. However, the shift position is Reverse (R), the processing proceeds to step S111.

In step S105, the vibration damper torque limit value setting unit 205 determines whether acceleration (i.e., depression of the accelerator pedal) or deceleration (i.e., depression of the brake pedal) is performed when the slippage determination flag is set to 1 (i.e., when slippage occurs). If, in step S105, it is determined that acceleration is performed, the processing proceeds to step S107. However, it is determined that deceleration is performed, the processing proceeds to step S109. In step S107, the vibration damper torque limit value setting unit 205 sets the positive vibration damper torque limit value to +0 Nm and sets the negative vibration damper torque limit value to −30 Nm. Similarly, in step S109, the vibration damper torque limit value setting unit 205 sets the positive vibration damper torque limit value to +0 Nm and sets the negative vibration damper torque limit value to −30 Nm.

In step S111, the vibration damper torque limit value setting unit 205 determines whether acceleration (i.e., depression of the accelerator pedal) or deceleration (i.e., depression of the brake pedal) is performed when the slippage determination flag is set to 1 (i.e., when slippage occurs). If, in step S111, it is determined that acceleration is performed, the processing proceeds to step S113. However, it is determined that deceleration is performed, the processing proceeds to step S115. In step S113, the vibration damper torque limit value setting unit 205 sets the positive vibration damper torque limit value to +30 Nm and sets the negative vibration damper torque limit value to −0 Nm. Similarly, in step S115, the vibration damper torque limit value setting unit 205 sets the positive vibration damper torque limit value to +30 Nm and sets the negative vibration damper torque limit value to −0 Nm.

As described above, according to the present exemplary embodiment, in the vibration damping control performed when the drive wheel 123 slips and, thereafter, regains grip and, thus, the rotational speed decreases, control is performed so that the drive wheel 123 stably regains grip and the vibration damper torque that increases consumption power is not output. Note that such control of the vibration damper torque continues for a predetermined period of time after the detection of slippage. As a result, reduction in power consumption can be achieved.

Figure 6:
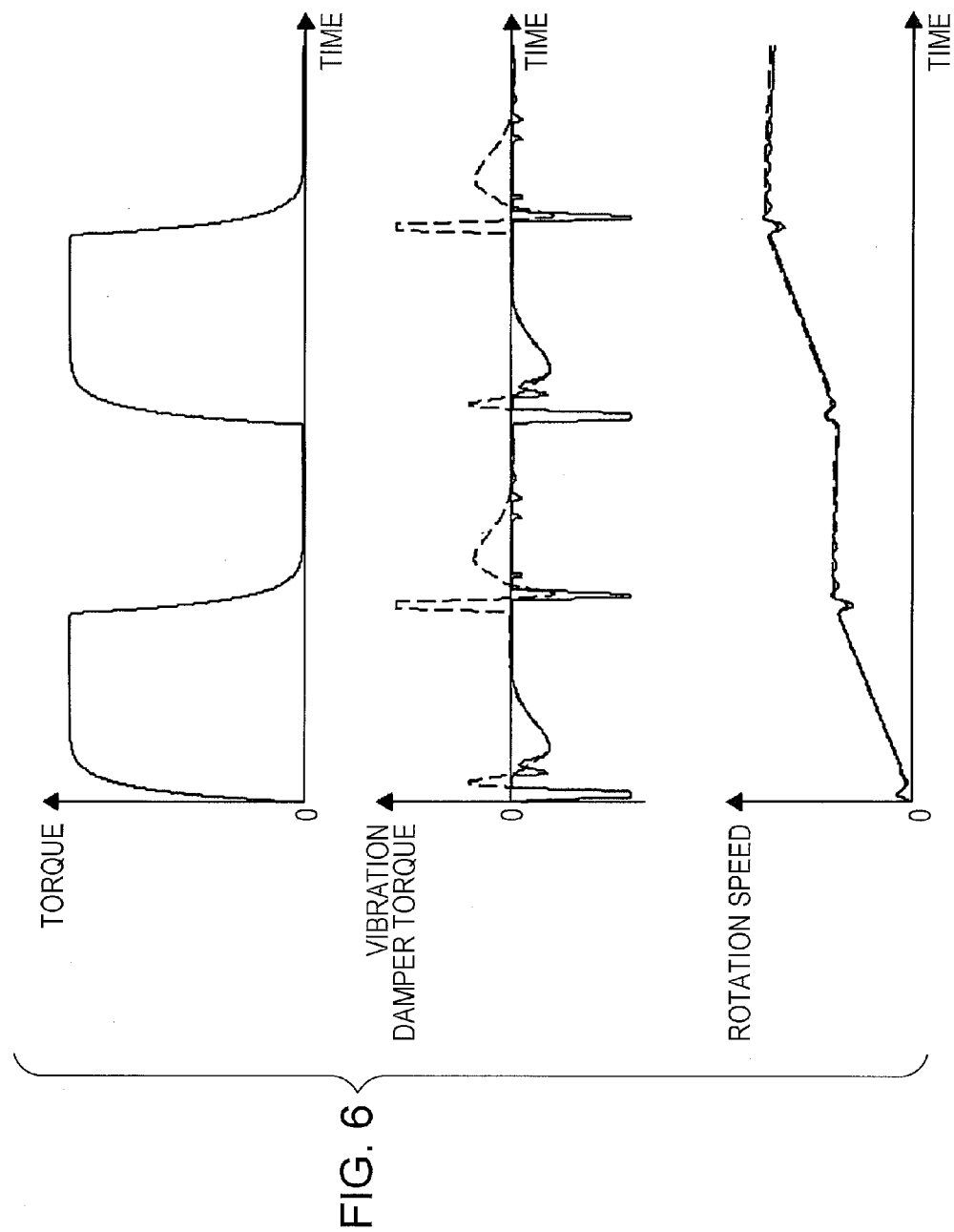
FIG. 6 is a graph illustrating an example of the rotational speed variations occurring when the vibration damping control based on the tentative vibration damper torque not limited by the vibration damper torque limit value is performed and when the vibration damping control based on the tentative vibration damper torque limited by the vibration damper torque limit value is performed in torque variation.

FIG. 6 is a graph illustrating an example of the rotational speed variations occurring when the vibration damping control based on the tentative vibration damper torque not limited by the vibration damper torque limit value is performed and when the vibration damping control based on the tentative vibration damper torque limited by the vibration damper torque limit value is performed in torque variation. A dotted line in the middle and lower sections of FIG. 6 indicates the rotational speed variation when the vibration damping control based on the tentative vibration damper torque is performed, and the solid line indicates the rotational speed variation when the vibration damping control based on the vibration damper torque limited by the vibration damper torque limit value is performed. If the vibration damper torque is limited, the vibration damper performance may decrease. However, even when the vibration damping control according to the present exemplary embodiment is performed, a slight variation component of the rotational speed is eliminated, as illustrated in the lower section of FIG. 6. In this manner, even when the vibration damper torque is limited as described in the present exemplary embodiment, a decrease in the vibration damper performance negligibly occurs.

Figure 7:
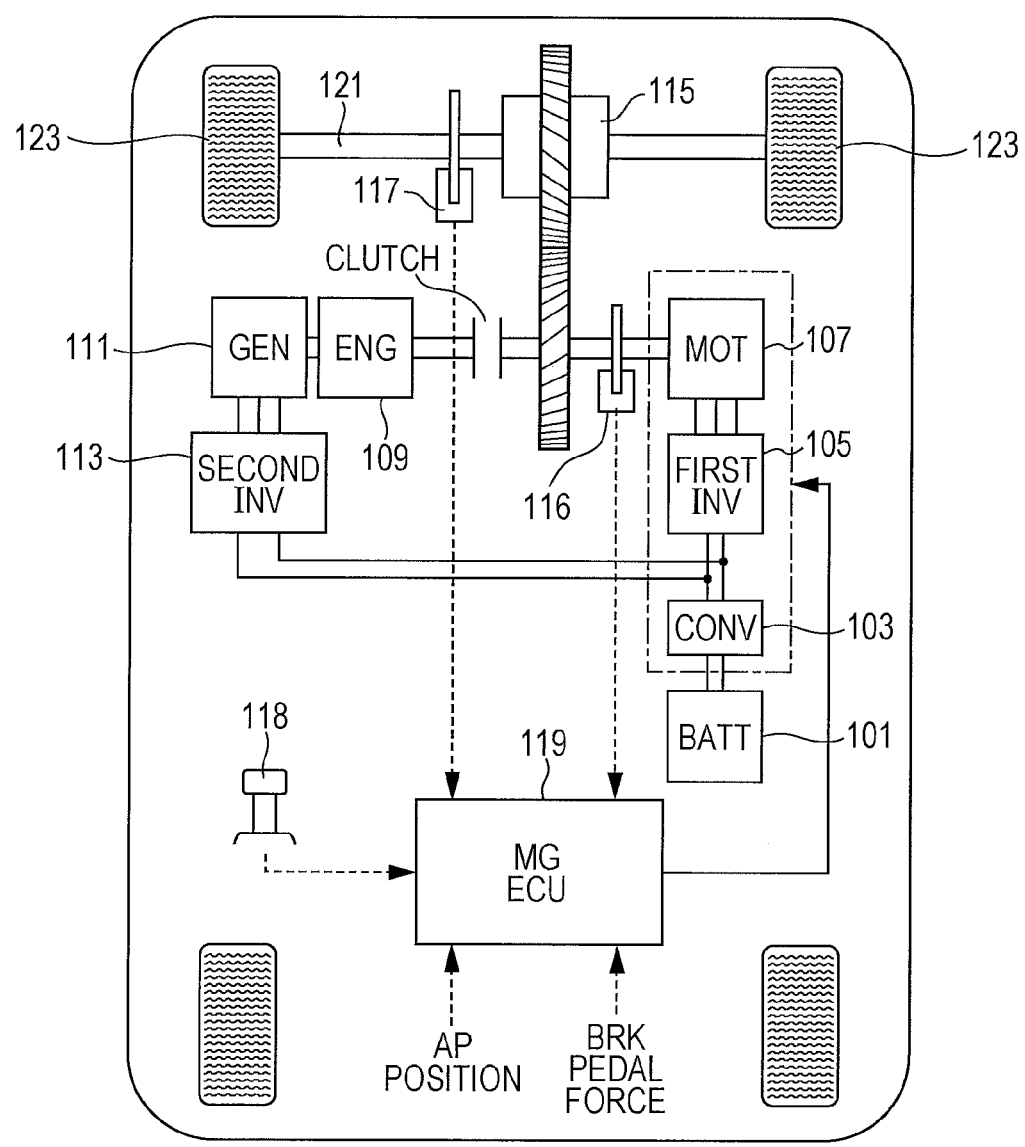
FIG. 7 is a block diagram of the internal configuration of a series-parallel HEV.

While the exemplary embodiment above has been described with reference to a series HEV, the technique of the exemplary embodiment is applicable to a series-parallel HEV illustrated in FIG. 7.

According to an embodiment, a drive control system (e.g., the management ECU 119 according to the exemplary embodiment) for an electric motor (e.g., the electric motor 107 according to the exemplary embodiment) mounted in a vehicle as a drive source is provided. The drive control system includes a slippage determination device or means (e.g., the slippage determination unit 203 according to the exemplary embodiment) configured to determine whether a drive wheel of the vehicle slips, a tentative vibration damper torque calculator or calculating means (e.g., the tentative vibration damper torque calculating unit 207 according to the exemplary embodiment) configured to calculate a tentative vibration damper torque for eliminating a variation component of a rotational speed of a drive axle mechanically connected to one of the electric motor and the drive wheel, a vibration damper torque limit value setting device or means (e.g., the vibration damper torque limit value setting unit 205 according to the exemplary embodiment) configured to set a limit value of a vibration damper torque for increasing an absolute value of the rotational speed of the electric motor or the drive axle for a predetermined period of time after the slippage determination device or means determines that the drive wheel slips, a vibration damper torque setting device or means (e.g., the vibration damper torque setting unit 209) configured to set the vibration damper torque obtained by limiting the tentative vibration damper torque using the limit value set by the vibration damper torque limit value setting device or means, and a control device or means (e.g., the current command value calculating unit 213 according to the exemplary embodiment) configured to control driving of the electric motor in accordance with a command value of a torque obtained by combining a requested torque for the electric motor with the vibration damper torque set by the vibration damper torque setting device or means.

The slippage determination unit according to the embodiment can determine that the drive wheel slips if a variation in the rotational speed of the electric motor per unit time is higher than or equal to a predetermined value.

The slippage determination unit according to the embodiment can determine that the drive wheel slips if a variation in the rotational speed of the drive axle per unit time is higher than or equal to a predetermined value.

The predetermined period of time according to the embodiment can be longer than one cycle time of a resonance frequency of rotational fluctuation caused by torsion of the drive axle. In this manner, excess output can be prevented. In addition, instability (hunting) of the result of slippage determination can be avoided.

The vibration damper torque limit value setting unit according to the embodiment can set a positive limit value and a negative limit value of the vibration damper torque.

According to the drive control system of the embodiment, the vibration damper torque for increasing the absolute value of the rotational speed of one the electric motor and the drive axle can be limited. In this manner, the drive wheel can stably regain grip after the drive wheel loses normal grip. In addition, an increase in electrical power consumed for the vibration damping control can be prevented.

Obviously, numerous modifications and variations of the present invention are possible in light of the above teachings. It is therefore to be understood that within the scope of the appended claims, the invention may be practiced otherwise than as specifically described herein.

What is claimed is:

1. A drive control system for an electric motor, comprising:
an electronic control unit programmed to:
determine whether a drive wheel of a vehicle slips, the determination that the drive wheel slips being maintained for a predetermined period of time after the drive wheel slips;
calculate a tentative vibration damper torque to reduce a variation component of a rotational speed of one of
a drive axle mechanically connected to the drive wheel, and
the electric motor mounted in the vehicle as a drive source;
set a limit value to limit the vibration damper torque to reduce the variation component of the rotational speed of one of the drive axle and the electric motor, the limit value including a positive vibration damper torque limit value and a negative vibration damper torque limit value based upon rotational vibration of the drive axle, the electric motor or both;

for the predetermined period of time after the determination that the drive wheel slips, reduce the limit value of the positive vibration damper torque limit value or the negative vibration damper torque limit value that is in a same direction as a rotational direction of the drive axle, the electric motor or both;

set a control torque obtained by limiting the tentative vibration damper torque using the limit value; and control driving of the electric motor in accordance with a command value of a torque obtained by combining a requested torque for the electric motor with the control torque so that an amount of the vibration damper torque applied to the one of the drive axle and the electric motor in the same direction as the rotational direction of the one of the drive axle and the electric motor is reduced.

2. The drive control system according to claim 1, wherein the slippage determination device determines that the drive wheel slips if a variation in the rotational speed of the electric motor per unit time is higher than or equal to a predetermined value.

3. The drive control system according to claim 1, wherein the slippage determination device determines that the drive wheel slips if a variation in the rotational speed of the drive axle per unit time is higher than or equal to a predetermined value.

4. The drive control system according to claim 1, wherein the predetermined period of time is longer than one cycle time of a resonance frequency of rotational fluctuation caused by torsion of the drive axle.

5. The drive control system according to claim 1, wherein the vibration damper torque limit value setting device is configured to set a positive limit value and a negative limit value of the vibration damper torque as the limit value.

6. A drive control system for an electric motor, comprising:

slippage determination means for determining whether a drive wheel of a vehicle slips, the slippage determination means maintains the determination that the drive wheel slips for a predetermined period of time after the drive wheel slips;

tentative vibration damper torque calculating means for calculating a tentative vibration damper torque to reduce a variation component of a rotational speed of one of
a drive axle mechanically connected to the drive wheel, and
the electric motor mounted in the vehicle as a drive source;

vibration damper torque limit value setting means for setting a limit value to limit the vibration damper torque to reduce the variation component of rotational speed of one of the drive axle and the electric motor, the limit value including a positive vibration damper torque limit value and a negative vibration damper torque limit value based upon rotational vibration of the drive axle, the electric motor or both, wherein the vibration damper torque limit value setting means, for the predetermined period of time after the determination that the drive wheel slips, reduces the limit value of the positive vibration damper torque limit value or the negative vibration damper torque limit value that is in a same direction as a rotational direction of the drive axle, the electric motor or both;

vibration damper torque setting means for setting a control torque obtained by limiting the tentative vibration damper torque using the limit value set by the vibration damper torque limit value setting means; and control means for controlling driving of the electric motor in accordance with a command value of a torque obtained by combining a requested torque for the electric motor with the control torque set by the vibration damper torque setting means so that an amount of the vibration damper torque applied to the one of the drive axle and the electric motor in the same direction as the rotational direction of the one of the drive axle and the electric motor is reduced.

7. A method of controlling an electric motor, the method comprising:

determining whether a drive wheel of a vehicle slips;

maintaining the determination that the drive wheel slips for a predetermined period of time after the drive wheel slips;

calculating a tentative vibration damper torque to reduce a variation component of a rotational speed of one of
a drive axle mechanically connected to the drive wheel, and
the electric motor mounted in the vehicle as a drive source;

setting a limit value to limit the vibration damper torque to reduce the variation component of rotational speed of one of the drive axle and the electric motor, the limit value including a positive vibration damper torque limit value and a negative vibration damper torque limit value based upon rotational vibration of the drive axle, the electric motor or both;

for the predetermined period of time after the determination that the drive wheel slips, reducing the limit value of the positive vibration damper torque limit value or the negative vibration damper torque limit value that is in a same direction as a rotational direction of the drive axle, the electric motor or both;

setting a control torque obtained by limiting the tentative vibration damper torque using the limit value; and controlling driving of the electric motor in accordance with a command value of a torque obtained by combining a requested torque for the electric motor with the control torque so that an amount of the vibration damper torque applied to the one of the drive axle and the electric motor in the same direction as the rotational direction of the one of the drive axle and the electric motor is reduced.

8. A drive control system for an electric motor, comprising:

an electronic control unit programmed to:

determine whether a drive wheel of a vehicle slips, the determination that the drive wheel slips being maintained for a predetermined period of time after the drive wheel slips;

calculate a tentative vibration damper torque to reduce a variation component of a rotational speed of one of
a drive axle mechanically connected to the drive wheel, and
the electric motor mounted in the vehicle as a drive source;

set, for the predetermined period of time after the determination that the drive wheel slips, a limit value to limit a vibration damper torque that increases an absolute value of the rotational speed of the electric motor or the drive axle;

set a control torque obtained by limiting the tentative vibration damper torque using the limit value; and control driving of the electric motor in accordance with a command value of a torque obtained by combining a requested torque for the electric motor with the control torque, wherein the predetermined period of time is set in accordance with a resonance frequency of rotational fluctuation caused by torsion of the drive axle.

9. The drive control system according to claim 8, wherein the predetermined period of time is set to a time longer than one cycle time of the resonance frequency of rotational fluctuation caused by torsion of the drive axle.

10. The drive control system according to claim 5, wherein the vibration damper torque setting device is configured to limit the tentative vibration damper torque within a range from the positive limit value to the negative limit value.

11. A drive control system for an electric motor, comprising:

an electronic control unit programmed to:

determine whether a drive wheel of a vehicle slips, the determination that the drive wheel slips being maintained for a predetermined period of time after the drive wheel slips;

calculate a tentative vibration damper torque to reduce a variation component of a rotational speed of one of a drive axle mechanically connected to the drive wheel, and the electric motor mounted in the vehicle as a drive source;

set, for the predetermined period of time after the determination that the drive wheel slips, a limit value to limit a vibration damper torque that increases an absolute value of the rotational speed of the electric motor or the drive axle;

set a control torque obtained by limiting the tentative vibration damper torque using the limit value; and control driving of the electric motor in accordance with a command value of a torque obtained by combining a requested torque for the electric motor with the control torque, wherein the vibration damper torque limit value setting device is configured to set a positive limit value and a negative limit value of the vibration damper torque as the limit value, wherein the vibration damper torque setting device is configured to limit the tentative vibration damper torque within a range from the positive limit value to the negative limit value, and wherein the positive limit value to the negative limit value are set on a basis of a shift position of a gear shift operation unit of the vehicle.

12. The drive control system according to claim 11, wherein the gear shift operation unit includes a forward drive shift position and a reverse shift position.

13. A drive control system for an electric motor, comprising:

slippage determination means for determining whether a drive wheel of a vehicle slips, the slippage determination means maintains the determination that the drive wheel slips for a predetermined period of time after the drive wheel slips;

tentative vibration damper torque calculating means for calculating a tentative vibration damper torque to reduce a variation component of a rotational speed of one of a drive axle mechanically connected to the drive wheel, and the electric motor mounted in the vehicle as a drive source;

vibration damper torque limit value setting means for setting, for the predetermined period of time after the slippage determination means determines that the drive wheel slips, a limit value to limit a vibration damper torque that increases an absolute value of the rotational speed of the electric motor or the drive axle;

vibration damper torque setting means for setting a control torque obtained by limiting the tentative vibration damper torque using the limit value set by the vibration damper torque limit value setting means; and control means for controlling driving of the electric motor in accordance with a command value of a torque obtained by combining a requested torque for the electric motor with the control torque set by the vibration damper torque setting means, wherein the predetermined period of time is set in accordance with a resonance frequency of rotational fluctuation caused by torsion of the drive axle.

14. The drive control system according to claim 13, wherein the predetermined period of time is set to a time longer than one cycle time of the resonance frequency of rotational fluctuation caused by torsion of the drive axle.

15. The drive control system according to claim 6, wherein the vibration damper torque limit value setting means is configured to set a positive limit value and a negative limit value of the vibration damper torque as the limit value, and wherein the vibration damper torque setting means is configured to limit the tentative vibration damper torque within a range from the positive limit value to the negative limit value.

16. A drive control system for an electric motor, comprising:

slippage determination means for determining whether a drive wheel of a vehicle slips, the slippage determination means maintains the determination that the drive wheel slips for a predetermined period of time after the drive wheel slips;

tentative vibration damper torque calculating means for calculating a tentative vibration damper torque to reduce a variation component of a rotational speed of one of a drive axle mechanically connected to the drive wheel, and the electric motor mounted in the vehicle as a drive source;

vibration damper torque limit value setting means for setting, for the predetermined period of time after the slippage determination means determines that the drive wheel slips, a limit value to limit a vibration damper torque that increases an absolute value of the rotational speed of the electric motor or the drive axle;

vibration damper torque setting means for setting a control torque obtained by limiting the tentative vibration damper torque using the limit value set by the vibration damper torque limit value setting means; and control means for controlling driving of the electric motor in accordance with a command value of a torque obtained by combining a requested torque for the electric motor with the control torque set by the vibration damper torque setting means, wherein the vibration damper torque limit value setting means is configured to set a positive limit value and a negative limit value of the vibration damper torque as the limit value, wherein the vibration damper torque setting means is configured to limit the tentative vibration damper torque within a range from the positive limit value to the negative limit value, and wherein the positive limit value to the negative limit value are set on a basis of a shift position of a gear shift operation unit of the vehicle.

17. The drive control system according to claim 16, wherein the gear shift operation unit includes a forward drive shift position and a reverse shift position.

18. A method of controlling an electric motor, the method comprising:

determining whether a drive wheel of a vehicle slips;

maintaining the determination that the drive wheel slips for a predetermined period of time after the drive wheel slips;

calculating a tentative vibration damper torque to reduce a variation component of a rotational speed of one of a drive axle mechanically connected to the drive wheel, and the electric motor mounted in the vehicle as a drive source;

setting, for the predetermined period of time after it is determined that the drive wheel slips, a limit value to limit a vibration damper torque that increases an absolute value of the rotational speed of the electric motor or the drive axle;

setting a control torque obtained by limiting the tentative vibration damper torque using the limit value; and controlling driving of the electric motor in accordance with a command value of a torque obtained by combining a requested torque for the electric motor with the control torque, wherein the predetermined period of time is set in accordance with a resonance frequency of rotational fluctuation caused by torsion of the drive axle.

19. The method according to claim 18, wherein the predetermined period of time is set to a time longer than one cycle time of the resonance frequency of rotational fluctuation caused by torsion of the drive axle.

* * * * *